(12) United States Patent
Watanabe

(10) Patent No.: US 8,385,716 B2
(45) Date of Patent: Feb. 26, 2013

(54) IMAGING APPARATUS

(75) Inventor: Katsumi Watanabe, Osaka (JP)

(73) Assignee: Panasonic Corporation, Osaka (JP)

( * ) Notice: Subject to any disclaimer, the term of this patent is extended or adjusted under 35 U.S.C. 154(b) by 269 days.

(21) Appl. No.: 12/961,704

(22) Filed: Dec. 7, 2010

(65) Prior Publication Data

US 2011/0135273 A1 Jun. 9, 2011

(30) Foreign Application Priority Data

Dec. 8, 2009 (JP) ................................. 2009-278122

(51) Int. Cl.
*H04N 5/77* (2006.01)
(52) U.S. Cl. .................................. 386/224; 348/231.99
(58) Field of Classification Search .................. 386/224; 348/231.99, 231.2, 231.3, 231, 8, 714, 715, 348/716
See application file for complete search history.

(56) References Cited

U.S. PATENT DOCUMENTS

| | | | |
|---|---|---|---|
| 7,233,489 B2 * | 6/2007 | Toyama et al. | 361/679.31 |
| 7,996,613 B2 * | 8/2011 | Wang | 711/115 |
| 8,170,402 B2 * | 5/2012 | Frost-Ruebling et al. | 386/338 |
| 2005/0046709 A1 * | 3/2005 | Nagai | 348/231.8 |
| 2007/0058923 A1 * | 3/2007 | Buhler | 386/46 |
| 2007/0236584 A1 * | 10/2007 | Frost-Ruebling et al. | 348/231.99 |
| 2008/0049574 A1 * | 2/2008 | Yahata | 369/47.13 |
| 2008/0250030 A1 * | 10/2008 | Itoh | 707/100 |

FOREIGN PATENT DOCUMENTS

| | | | |
|---|---|---|---|
| JP | 2002-351705 | | 12/2002 |
| JP | 2006/180007 | * | 7/2006 |
| JP | 2009-282851 | * | 12/2009 |
| WO | WO 2004/082270 | * | 9/2004 |
| WO | WO 2008/042065 | * | 4/2008 |

* cited by examiner

*Primary Examiner* — David Harvey
(74) *Attorney, Agent, or Firm* — Wenderoth, Lind & Ponak, L.L.P.

(57) ABSTRACT

An imaging apparatus includes an image unit, a video recording medium configured to store video data generated by the imaging unit, and a controller configured to control recording of the video data in the video recording medium. The video recording medium includes a first recording medium having a data area in which data can be recorded, and at least one second recording medium having first and second data areas in which data can be recorded. The second data area can be written data at a higher speed than a speed for writing data in the first data area. The controller records video data and management data for managing the video data in the first recording medium, using whole data area of the first recording medium. The controller records video data in the second recording medium, using only the second data area of the second recording medium.

4 Claims, 7 Drawing Sheets

IMAGING APPARATUS

BACKGROUND

1. Technical Field

The technical field relates to an imaging apparatus, and in particular relates to the imaging apparatus that uses a plurality of recording media virtually as one recording medium.

2. Related Art

Conventionally, in a video camera, a video tape, an optical disc, a hard disc and the like are used as a recording medium for recording a captured moving image. In recent years, a video camera using semiconductor memories such as flash memories has been widely spread. Such a video camera using semiconductor memories has advantages in compact size and light weight, and further in reliability because no mechanical structure as means for storing data is required.

On the other hand, as image quality of video pictures to be recorded by a video camera becomes higher, higher capacity of recording media is desired.

Prices of semiconductor memories greatly fluctuate due to market conditions of memories. Therefore, in a certain market condition, in order to provide a recording medium having necessary capacity, it may be more advantageous in the cost to use combinations of a plurality of semiconductor memories with low capacity than to use one semiconductor memory.

Generally a video camera requires real-time recording of video pictures. Therefore, when using a combination of a plurality of semiconductor memories, it is necessary to sequentially record video streams over a plurality of semiconductor memories in a stable manner (namely, securing real-time property).

JP 2002-351705 A discloses a digital signal recording/reproducing apparatus for dividing a data file into a plurality of drive spaces to record them and reproducing the divided and recorded data files. This digital signal recording/reproducing apparatus stores drive area information and FAT of the divided files as management information in a nonvolatile semiconductor memory, and records the data into a hard disc drive (HDD). Further, the digital signal recording/reproducing apparatus refers to the drive area information and FAT of the divided files and reproduces the divided and recorded data files as one file.

JP 2002-351705 A discloses the technique that records data into a plurality of recording media, but its object is to achieve continuity of recording data and effective utilization of recording areas. That is to say, JP 2002-351705 A does not concern recording of data stably (namely, securing real-time property) and continuously, which is necessary for video recording, at the time of recording data over a plurality of recording media, and fails to disclose a technique to do so.

SUMMARY

It is an object to provide an imaging apparatus which uses a plurality of recording media virtually as one recording medium, capable of recording data to the recording media stably and continuously.

In one aspect, an imaging apparatus is provided which includes an image unit, a video recording medium configured to store video data generated by the imaging unit, and a controller configured to control recording of the video data in the video recording medium. The video recording medium includes a first recording medium having a data area in which data can be recorded, and at least one second recording medium having first and second data areas in which data can be recorded. The second data area can be written data at a higher speed than a speed for writing data in the first data area. The controller records video data and management data for managing the video data in the first recording medium, using whole data area of the first recording medium. The controller records video data in the second recording medium, using only the second data area of the second recording medium.

According to the above aspect, the imaging apparatus when using a plurality of recording media virtually as one recording medium can be provided, which can record data in the recording medium stably and continuously.

DETAILED DESCRIPTION OF PREFERRED EMBODIMENTS

Embodiments are described below with reference to the accompanying drawings.

1. First Embodiment

Figure 1:
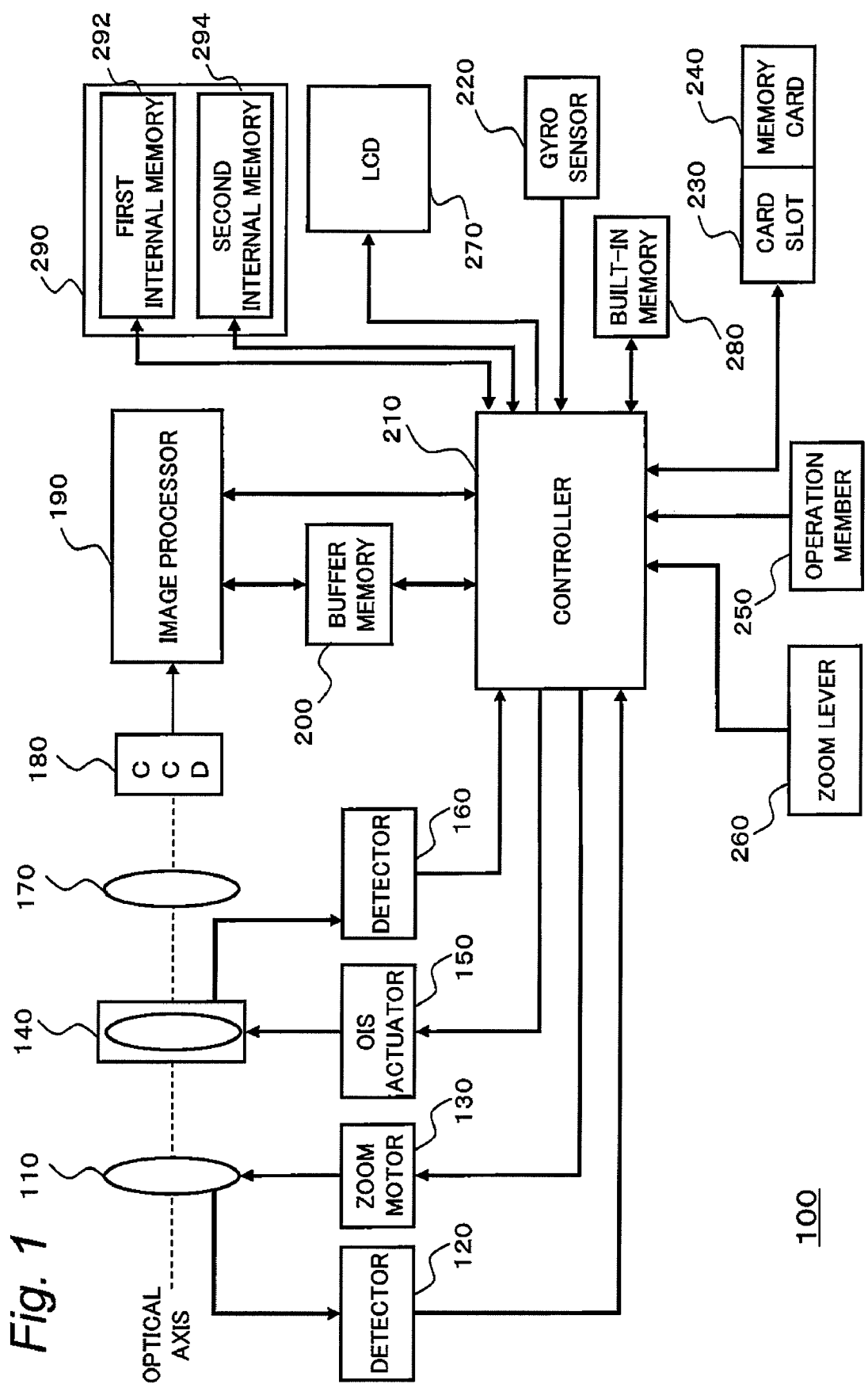
FIG. 1 is a block diagram illustrating a configuration of a digital video camera.

The following describes a digital video camera as an example in a first embodiment 1-1. Outline FIG. 1 is a block diagram illustrating a configuration of a digital video camera 100. The digital video camera 100 according to the first embodiment has a first internal memory 292 and a second internal memory 294 composing a video recording medium. The digital video camera 100 treats the first internal memory 292 and the second internal memory 294 virtually as one video recording memory 290. The digital video camera 100 records video data and management data in all areas of the first internal memory 292, and records video data only in an area of the second internal memory 294 in which high-speed writing is possible. That is to say, in the digital video camera 100, an area of the second internal memory 294 in which the writing speed is lower are not used. As a result, the digital video camera 100, when the two internal memories are virtually used as one video recording memory, can achieve continuous and stable recording of data to the video recording memory. Details of such a digital video camera 100 is described below.

1-2. Configuration 1-2-1. Configuration of Digital Video Camera

A configuration of the digital video camera 100 according to the first embodiment is described with reference to FIG. 1. The digital video camera 100 captures a subject image formed by an optical system including a zoom lens 110 or the like using a CCD image sensor 180. A video stream generated by the CCD image sensor 180 is subject to various processes in an image processor 190, and is stored in the video recording memory 290. The video stream stored in the video recording memory 290 can be displayed on a liquid crystal display (LCD) monitor 270, and can be copied to a removable memory card 240 as required.

The optical system of the digital video camera 100 includes the zoom lens 110, an OIS (Optical Image Stabilizer) 140 and a focus lens 170. The zoom lens 110 moves along an optical axis of the optical system to enlarge or reduce a subject image. Further, the focus lens 170 moves along the optical axis of the optical system to adjust a focus of the subject image.

The OIS 140 has a correction lens that can move in a plane vertical to the optical axis. The OIS 140 drives the correction lens in a direction which cancels shake of the digital video camera 100, thereby reducing shake of a subject image.

A zoom motor 130 drives the zoom lens 110. The zoom motor 130 may be realized by a pulse motor, a DC motor, a linear motor, a servomotor or the like. The zoom motor 130 may be configured to drive the zoom lens 110 with a mechanism such as a cam mechanism or a ball screw. A detector 120 detects a position on the optical axis of the zoom lens 110. The detector 120 outputs a signal relating to the position of the zoom lens 110 by means of a switch such as a brush according to the movement of the zoom lens 110 in the optical axis direction.

An OIS actuator 150 drives the correction lens in the OIS 140 in the plane vertical to the optical axis. The OIS actuator 150 can be realized by a planar coil or an ultrasonic motor. Further, a detector 160 detects a travel distance of the correction lens in the OIS 140.

A CCD image sensor 180 captures a subject image formed by the optical system including the zoom lens 110 or the like to generate a video stream. The CCD image sensor 180 performs various operations such as exposure, transfer, and electronic shutter.

An image processor 190 performs various image processes to the video stream generated by the CCD image sensor 180. The image processor 190 processes the video stream generated by the CCD image sensor 180 to generate the video stream to be displayed on the liquid crystal display monitor 270 or to generate the video stream to be stored in the memory card 240. For example, the image processor 190 executes various processes such as gamma correction, white balance correction, and scratch correction on the video stream generated by the CCD image sensor 180. Further, the image processor 190 compresses the video stream generated by the CCD image sensor 180 according to a compressing format conforming to an H.264 standard, an MPEG-2 standard, or the like. The image processor 190 can be realized by a DSP (Digital Signal Processor) or a microcomputer.

A controller 210 is a control unit for controlling the entire operation of the digital video camera 100. The controller 210 can be realized by a semiconductor element or the like. The controller 210 may be constituted only by hardware or a combination of hardware and software. The controller 210 can be realized by a microcomputer, or the like.

A buffer memory 200 functions as a work memory of the image processor 190 and the controller 210. The buffer memory 200 can be realized by a DRAM, a ferroelectric memory, or the like.

The liquid crystal display monitor 270 can display an image based on the video stream generated by the CCD image sensor 180 and an image based on the video stream read from the memory card 240.

A gyro sensor 220 is made of an oscillating material such as a piezoelectric element. The gyro sensor 220 oscillates the oscillating material such as the piezoelectric element at a constant frequency, and converts a force due to a Coriolis force into a voltage to obtain angular velocity information. Shake of the digital video camera 100 is detected based on the angular velocity information from the gyro sensor 220, and the correction lens in the OIS 140 is driven to a direction which cancels the shake so that camera shake of the digital video camera 100 can be corrected.

The memory card 240 is inserted to a card slot 230 so that the card slot 230 can be mechanically and electrically connected to the memory card 240. The memory card 240 includes a flash memory, a ferroelectric memory, or the like and can store data. Image data can be exchanged between the digital video camera 100 and another electronic device via the memory card 240.

The video recording memory 290 is a medium for recording image data imaged by the digital video camera 100. The video recording memory 290 has the first and second internal memories 292 and 294, and they are non-removable nonvolatile memory devices. Each of the first internal memory 292 and the second internal memory 294 is composed of a memory controller and a flash memory, for example. Details of the first internal memory 292 and the second internal memory 294 are described later.

Figure 2:
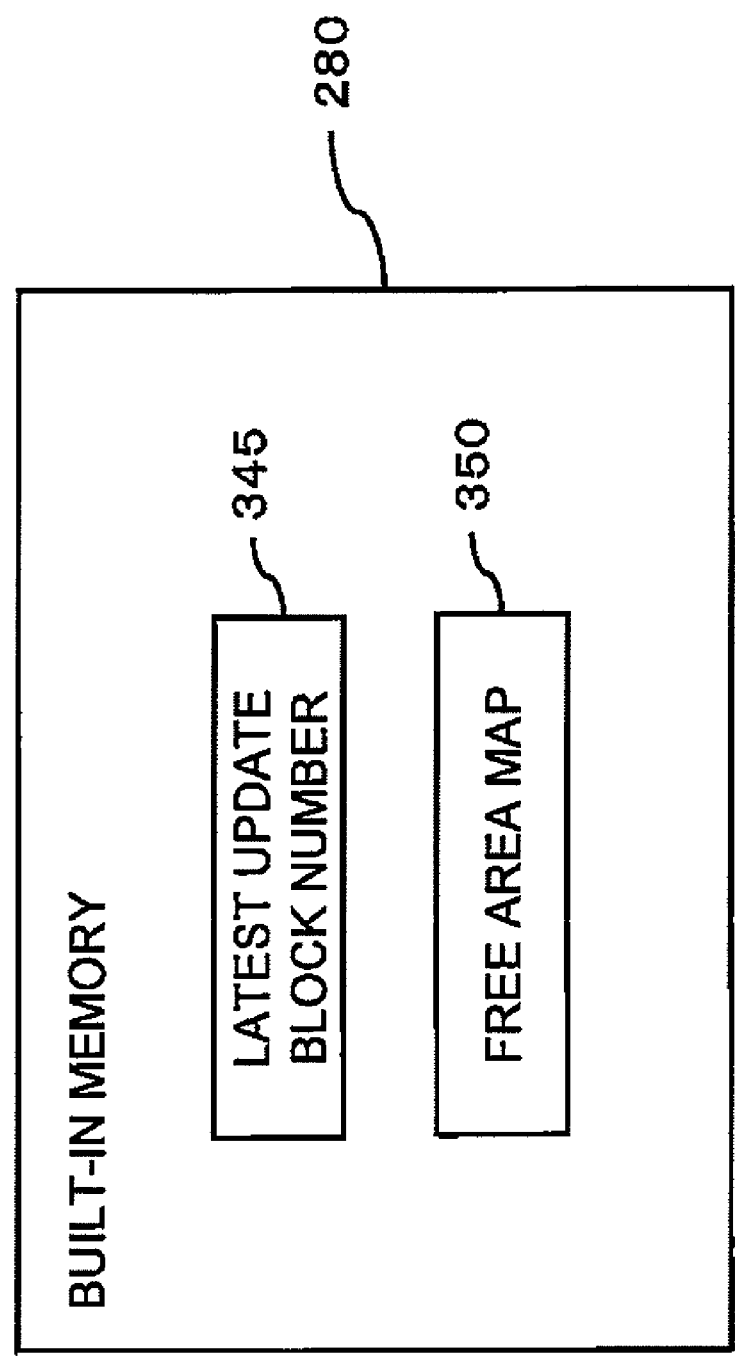
FIG. 2 is a diagram describing information to be stored in a built-in memory.

An built-in memory 280 stores a control program for entirely controlling the digital video camera 100. Particularly, the internal memory 280 stores a free area map 350 as shown in FIG. 2. The free area map 350 is a map for managing free areas in the first internal memory 292 and the second internal memory 294. Further, the internal memory 280 stores a latest update block number 345 representing a block number finally updated in the first internal memory 292 and the second internal memory 294. The internal memory 280 is composed of a flash memory or a ferroelectric memory. Details of the free area map 350 and the latest update block number 345 are described later.

An operation member 250 is a collective term of members for receiving operations from a user. A zoom lever 260 is a member for receiving instruction form a user for changing a zoom magnification.

1-2-2. Configuration of Internal Memory

Figure 3:
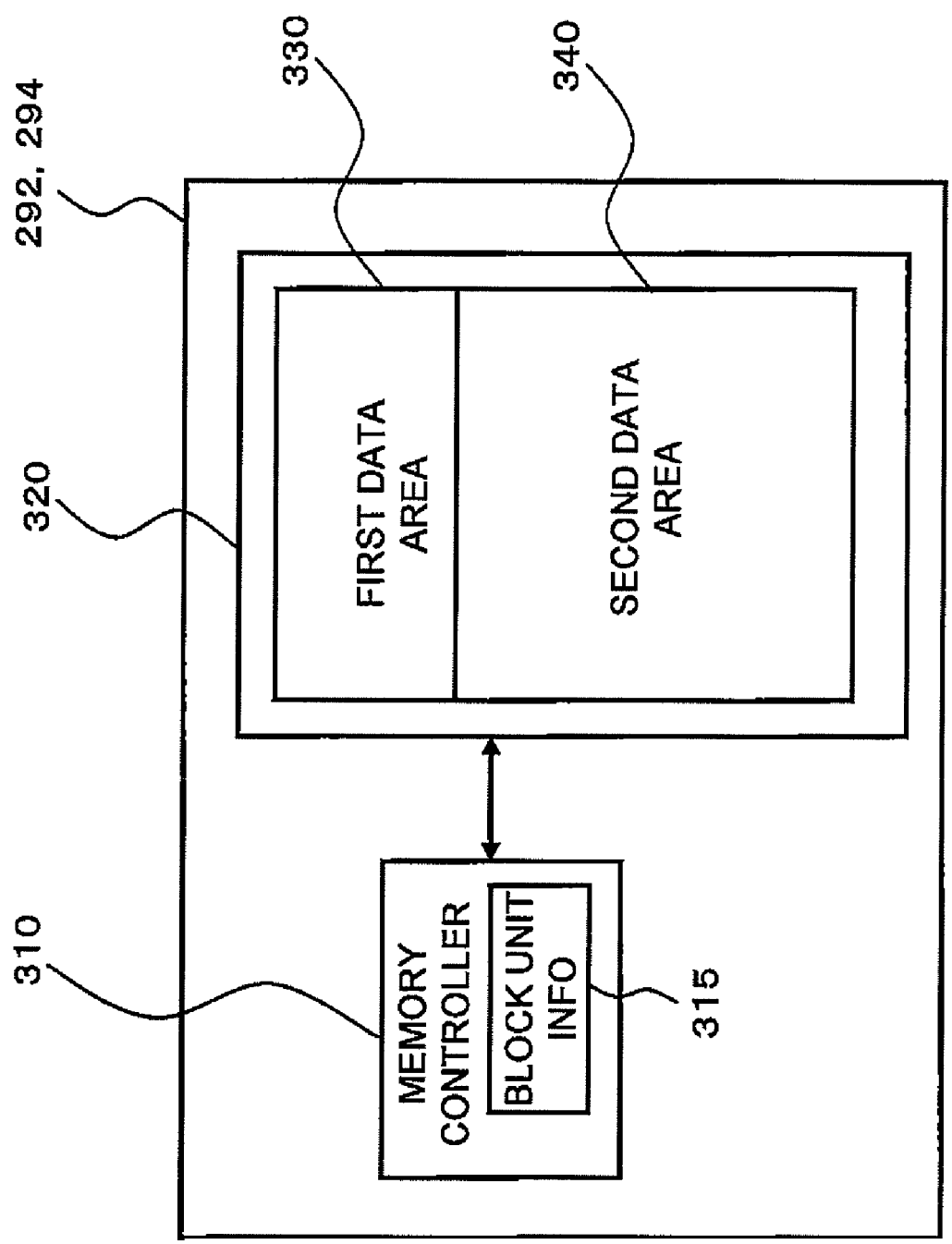
FIG. 3 is a block diagram illustrating a configuration of an internal memory.

The first and second internal memories 292 and 294 composing the video recording memory 290 are described with reference to FIG. 3. FIG. 3 is a block diagram illustrating the configuration of the first and second internal memories 292 and 294.

The first internal memory 292 and the second internal memory 294 have a memory controller 310 and a flash memory 320 as a nonvolatile storage element, respectively. The memory controller 310 is a control unit for controlling writing of data to the flash memory 320. Further, the flash memory 320 is a recording medium for storing data.

The memory controller 310 controls a request for reading/writing data from/to the flash memory 320. The memory controller 310 holds information about the flash memory 320 in an embedded register.

For example, the memory controller 310 stores block unit information 315 in the embedded register. The block unit means an erase size used for writing data to the flash memory 320. In the present embodiment, the block unit is 4 MB. In the present embodiment, the controller 210 controls the first internal memory 292 or the second internal memory 294 so that a video stream is written by 4 MB, that is the same as the block unit, in the flash memory 320. This is because by making the erase unit in the flash memory 320 equal to the unit for newly writing a video stream to the flash memory 320, one writing operation of a video stream can be completed by one erasing operation of block in the first flash memory.

The flash memory 320 is a nonvolatile recording medium for storing data. The flash memory 320 has a first data area 330 and a second data area 340.

The first data area 330 is an area where a verifying process for confirming whether the writing is normally completed is executed when data is written. When a failure of the writing is recognized by the verifying process, the memory controller 310 allocates, as an alternate area, an other area in the first data area 330 different from the area where the writing is performed, and performs the writing again to the alternate area (retry). The first data area 330 provides data with high reliability, and thus management information necessary for a file access such as a file allocation table in a FAT file system requiring reliability is recorded in the first data area 330.

The second data area 340 is an area where the verifying process is not executed when data is written. Since the verifying process is not executed in the second data area 340, the data reliability in the second data area 340 is lower than that in the first data area 330, but data can be written at a higher speed. For this reason, video stream, and general data such as a management file added to the video stream are recorded in the second data area 340. The second data area 340 has addresses in multiples of the erase size as starting address, so that recording from the optimum writing starting address assumed by the flash memory 320 is possible.

1-2-3. Allocation of Logical Addresses to Internal Memories

Allocation of the logical addresses to the video recording memory 290, that is, the internal memories 292 and 294 in the digital video camera 100 according to the present embodiment is described.

Figure 4:
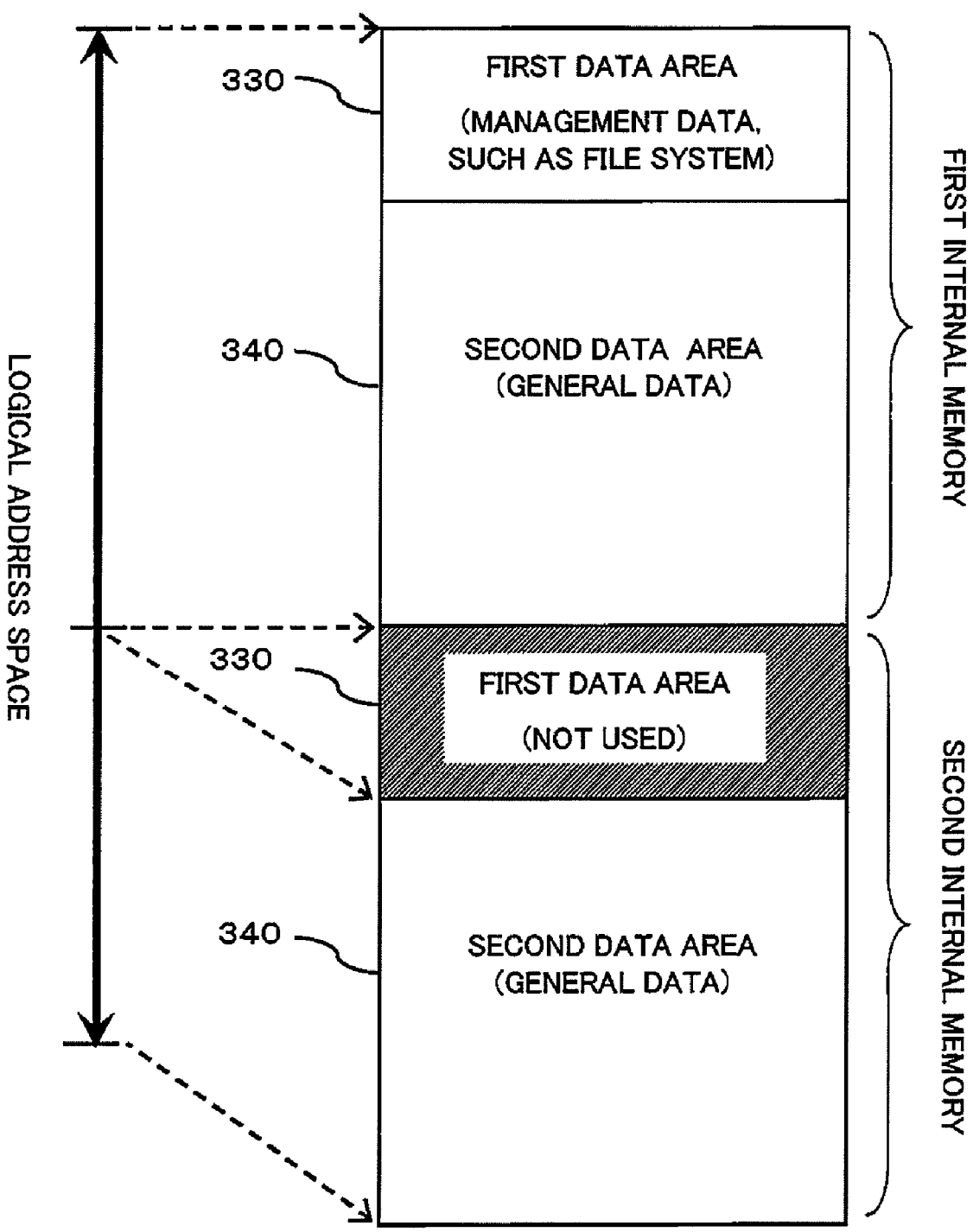
FIG. 4 is a block diagram describing allocation of logical addresses to a plurality of internal memories.

FIG. 4 is a diagram illustrating correspondence between a logical address space (logical address space of the video recording memory 290) that is allocated to the areas in which video data is recorded, and the data areas of the first internal memory 292 and the second internal memory 294. As shown in FIG. 4, in the present embodiment, the logical addresses are allocated continuously to the first data area 330 and the second data area 340 of the first internal memory 292, and the second data area 340 of the second internal memory 294. Management information, such as FAT, for managing data recorded in the second data areas 340 of the first internal memory 292 and the second internal memory 294 is stored in the first data area 330 of the first internal memory 292. In such a manner, in the present embodiment, the first data area 330 of the second internal memory 294 is not used. That is to say, the second data area 340 of the first internal memory 292 and the second data area 340 of the second internal memory 294 where high-speed writing is possible are continuously used as an area for recording general data. As a result, the digital video camera 100 can achieve the high-speed recording of the general data.

1-2-4. Free Area Map

Figure 5:
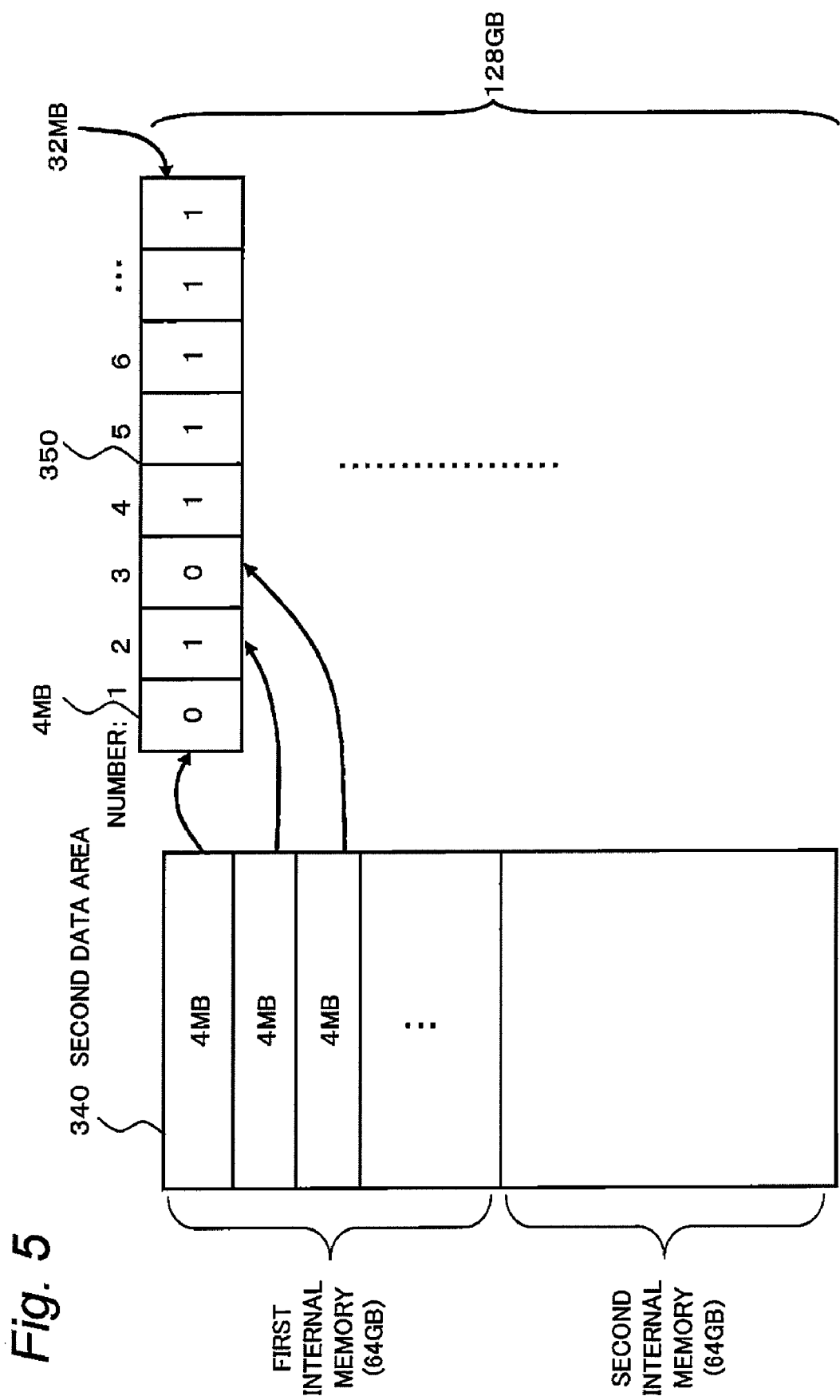
FIG. 5 is a diagram describing a free area map.

The free area map 350 stored in the built-in memory 280 is described with reference to FIG. 5. FIG. 5 is a block diagram illustrating a configuration of the free area map.

The free area map 350 is a map showing a used area and a free (unused) area of the first internal memory 292 and the second internal memory 294. The controller 210 referring to the free area map 350 can detect which block in the first internal memory 292 and the second internal memory 294 is free.

The free area map 350 is a map for managing, in block unit, a usage state of the second data area 340 in the first internal memory 292 and the second internal memory 294 (4 MB). That is to say, the free area map 350 sets "0" or "1" in each block to manage whether each block is used. In the present embodiment, "0" represents that a block is not used, and "1" represents that the block is used. In the present embodiment, the first internal memory 292 and the second internal memory 294 compose one virtual volume. Each block is numbered sequentially from a head and managed. The controller 210 records a number (latest updating block number 345) of a block in which a video stream is finally recorded into the internal memory 280 every time 4 MB of recording of video stream is completed.

The free area map 350 is generated on power-on of the digital video camera 100 by the controller 210 analyzing the insides of the first internal memory 292 and the second internal memory 294.

1-2-5. Correspondence of Terms

The CCD image sensor 180 is one example of an imaging unit. The video recording memory 290 composed of the first internal memory 292 and the second internal memory 294 is one example of a video recording medium. The controller 210 is one example of a controller.

1-3. Operation

Figure 6:
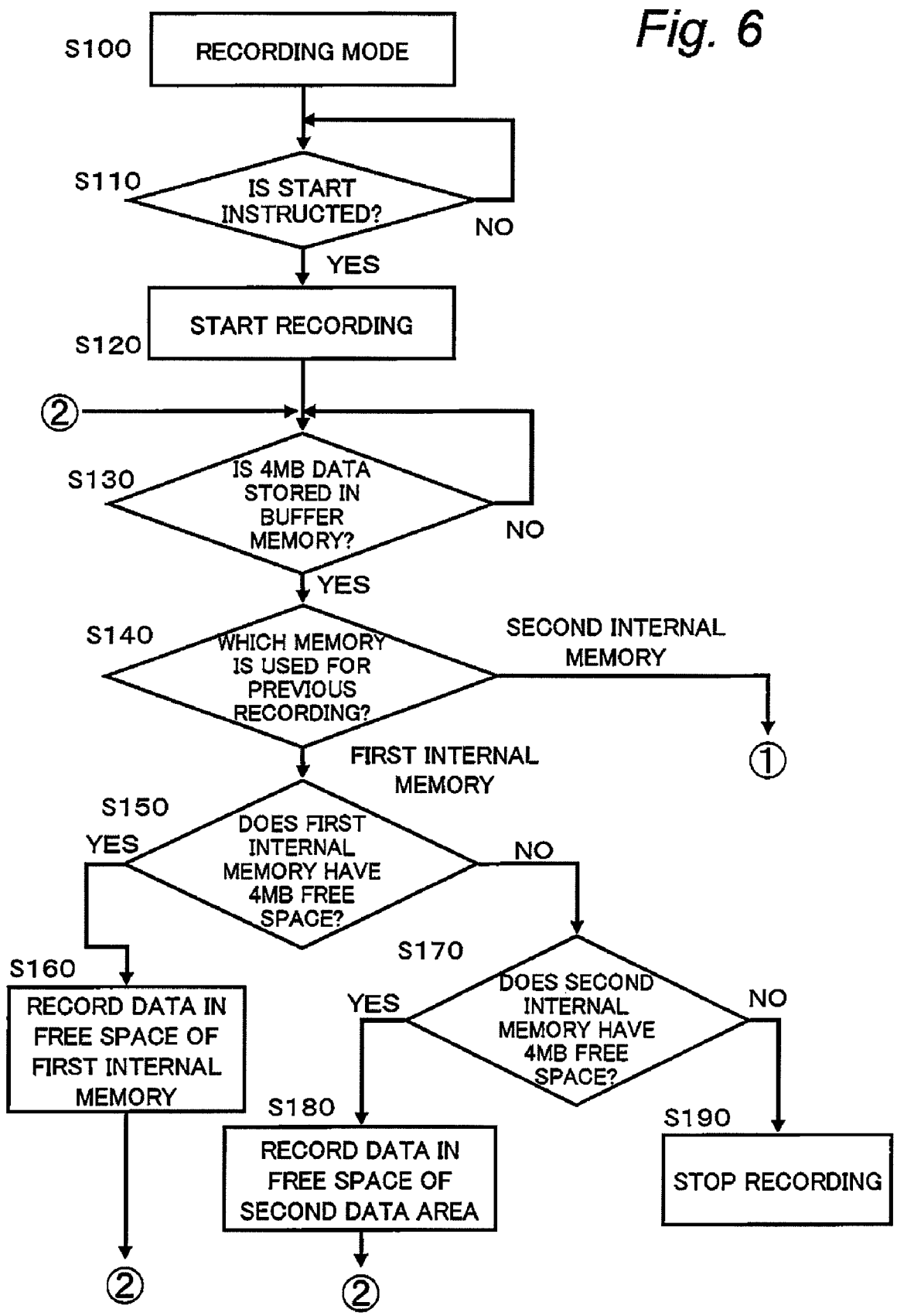
FIG. 6 is a flowchart of an operation for recording video data in the digital video camera.

An operation for recording a video stream to the video recording memory 290 (the first internal memory 292 or the second internal memory 294) in the digital video camera 100 according to the present embodiment is described with reference to flowcharts of FIGS. 6 and 7.

A user can set the digital video camera 100 to a recording mode by operating the operation member 250 (for example, a mode dial). When the digital video camera 100 is set to the recording mode (S100), the controller 210 waits until the user instructs starting the recording of a moving image (110). When starting the recording of a moving image is instructed by the user, the controller 210 starts the recording of a video stream generated by the CCD image sensor 180 to the buffer memory 200 (S120).

When the recording of a video stream to the buffer memory 200 is started, the controller 210 determines whether 4 MB (block unit) of video stream is stored in the buffer memory 200 (S130). When determining that 4 MB of video stream is not stored, the controller 210 waits until 4 MB of video stream is stored in the buffer memory 200.

When determining that 4 MB of video stream is stored, the controller 210 determines whether an internal memory in which the video stream is written at the previous time is the first internal memory 292 or the second internal memory 294 (S140). This determination is made by referring to the latest update block number 345 stored in the built-in memory 280.

When determining that the internal memory in which the video stream is written at the previous time is the first internal memory 292, the controller 210 determines whether 4 MB of free area is present in the first internal memory 292 (S150). Specifically, the controller 210 refers to the free area map 350 and determines whether 4 MB of the free area is present in the first internal memory 292.

When determining that 4 MB of the free area is present in the first internal memory 292, the controller 210 transmits a command to the first internal memory 292 so that 4 MB of video stream stored in the buffer memory 200 is recorded in the first internal memory 292 (S160). The command includes information about a logical address indicating a start position of writing a video stream and a size (4 MB) of the video stream.

On the other hand, when determining that 4 MB of the free area is not present in the first internal memory 292, the controller 210 determines whether 4 MB of a free area is present in the second internal memory 294 (S170).

When determining that 4 MB of the free area is present in the second internal memory 294, the controller 210 transmits a command to the second internal memory 294 so that the video stream stored in the buffer memory 200 is recorded to the second internal memory 294 (S180). At this time, the controller 210 transmits, to the second internal memory 294, a command with a logical address specified so that the video stream is written in the second data area 340 of the second internal memory 294 but is not written in the first data area 330 of the second internal memory 294.

On the other hand, when determining that 4 MB of the free area is not present in the second internal memory 294, the controller 210 controls the image processor 190 to stop the generation of the video stream (S190).

Figure 7:
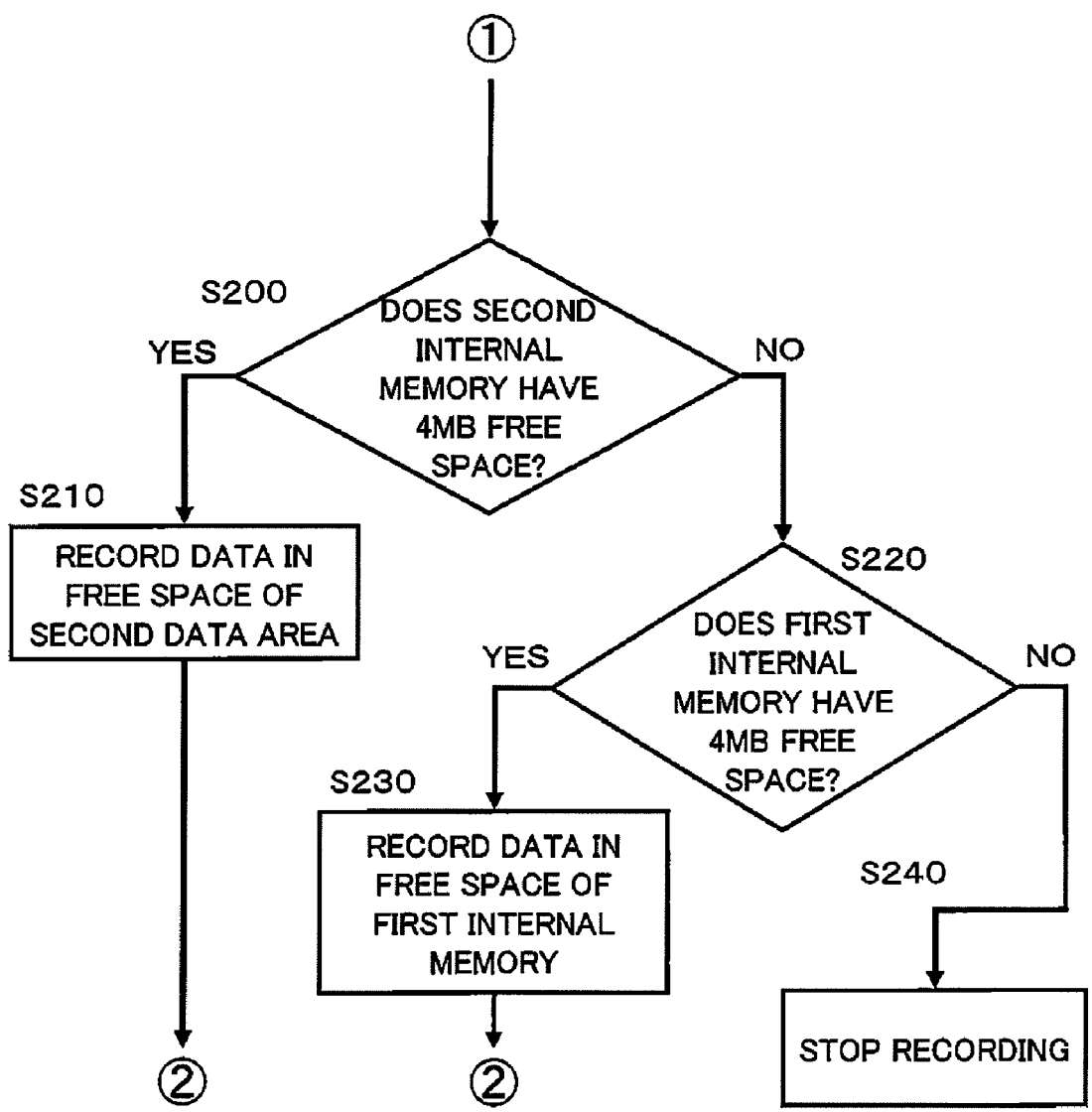
FIG. 7 is a flowchart of an operation for recording the video data in the digital video camera (continued from FIG. 6).

When the determination is made in step S140 that the internal memory in which the video stream is recorded at the previous time is the second internal memory, the process in the flowchart shown in FIG. 7 is executed. That is to say, the controller 210 determines whether 4 MB of free area is present in the second internal memory 294 (S200).

When determining that 4 MB of free area is present in the second internal memory 294, the controller 210 transmits a command to the second internal memory 294 so that 4 MB of video stream stored in the buffer memory 200 is recorded in the second data area 340 of the second internal memory 292 (S210).

On the other hand, when determining that 4 MB of free area is not present in the second internal memory 294, the controller 210 determines whether 4 MB of free area is present in the first internal memory 292 (S220).

When determining that 4 MB of free area is present in the first internal memory 292, the controller 210 transmits a command to the first internal memory 292 so that the video stream stored in the buffer memory 200 is recorded in the first internal memory 292 (S210). On the other hand, when 4 MB of free area is not present in the first internal memory 292, the controller 210 controls the image processor 190 to stop the generation of the video stream (S240).

In this manner, the digital video camera 100 according to the present embodiment handles the two internal memories 292 and 294 as one virtual memory, and records the management information for video streams that are recorded in the internal memories 292 and 294 in the first internal memory 292. When a video stream is recorded in the second internal memory 294, the video stream is recorded in the second data area 340 where the verifying process is not executed at all, that is, high-speed writing is possible. As a result, the recording of a video stream is not subject to the verifying process, and it does not take excess time for the verifying process in recording of a video stream. As a result, possibility of overflow of video stream in the buffer memory 200 can be reduced so that continuous recording of the video stream can be done stably.

In the present embodiment, when the plurality of recording media 292 and 294 are used as one virtual recording medium, only the data area 340 where the high-speed writing process can be executed is used in the plurality of recording media 292 and 294. Hence, the digital video camera 100, that can continuously record data in the video recording medium 290 at real time (namely, stably), can be realized.

2. Other Embodiments

As described above, the first embodiment is explained. However, the embodiment is not limited to the above. Other embodiments are described below.

The optical system and the drive system of the digital video camera 100 according to the first embodiment are not limited to those shown in FIG. 1. For example, FIG. 1 illustrates the optical system having a three-group structure, but the lens may take another group structure. The respective lenses may be configured as one lens or may be configured as a lens group including a plurality of lenses.

In the first embodiment, the CCD image sensor 180 illustrated as the imaging unit, but a CMOS image sensor or an NMOS image sensor may be used as the imaging unit.

In the first embodiment, the block unit of the internal memory is 4 MB, but it may have another size. For example, the size may be 6 MB or 8 MB.

In the first embodiment, the block unit of the embedded memories is equal to the unit of writing into the embedded memories. However, such a constitution is not necessarily required. The writing unit may be larger than the block unit. In this case, in step S160 of FIG. 6, 4 MB of video stream is sequentially recorded into the first internal memory 292, and when the residual video stream cannot be recorded into the first internal memory 292, the residual video stream may be recorded into the second internal memory 294.

In the first embodiment, two internal memories 292 and 294 are used to compose one video recording memory 290. The number of internal memories composing the video recording memory may be three or more. In this case, management information for managing data of all the internal memories is stored in the first data area of the first internal memory. Data are stored only in the second data areas of the second and thereafter internal memories where the high-speed access is possible. That is to say, logical addresses may be sequentially allocated to the first and second data areas of the first internal memory and the second data areas of the second and thereafter internal memories.

In the first embodiment 1, an area in the first and second internal memories 292 and 294 where the verifying process is executed at the time of writing is the first data area, and an area where the verifying process is not executed at the time of writing is the second data area. The first data area may be, however, include a part of an area where the verifying process is not executed at the time of writing. That is to say, the second data area where the video data is recorded may be composed of only areas where the high-speed writing is performed. Therefore, the first data area in the first and second internal memories 292 and 294 can be set to an area with a predetermined size starting from the head of the storage space in the flash memory 320 so as to include an area where the verifying process is executed at the time of writing.

The first data area 330 may be determined in the following manner. When the digital videos camera 100 is turned on, the first and second internal memories 292 and 294 are checked. An area where the writing speed is low and an area where the writing speed is high are determined. According to the result of the determination, the first data area 330 in the first and second embedded memories 292 and 294 may be determined respectively.

The first embodiment described the digital video camera 100 as one example, but the idea of the embodiments can be applied to an electronic device that uses plural recording media virtually as one recording medium. For example, the idea of the Above embodiments can be applied to a digital still camera, an audio recorder such as an IC recorder, a music playback apparatus, and an information processing apparatus such as a personal computer.

INDUSTRIAL APPLICABILITY

The aforementioned embodiments can be applied to an electronic apparatus that virtually uses plural recording media as one recording medium (for example, an imaging apparatus such as a digital still camera and a digital video camera, an audio recorder such as an IC recorder, a music playback apparatus, and an information processing apparatuses such as a personal computer).

What is claimed is:

1. An imaging apparatus comprising:
   an image unit;
   a video recording medium configured to store video data generated by the imaging unit; and
   a controller configured to control recording of the video data in the video recording medium,
   wherein the video recording medium includes:
      a first recording medium having a data area in which data can be recorded; and
      at least one second recording medium having first and second data areas in which data can be recorded, the second data area can be written data at a higher speed than a speed for writing data in the first data area,
   the controller records video data and management data for managing the video data in the first recording medium, using whole data area of the first recording medium, and the controller records video data in the second recording medium, using only the second data area of the second recording medium.

2. The imaging apparatus according to claim 1, wherein the management data recorded in the first recording medium manages the video data recorded in the first recording medium and the video data recorded in the second recording medium.

3. The imaging apparatus according to claim 1, wherein logical addresses are sequentially allocated to all the areas of the first recording medium and the second data area of the second recording medium.

4. The imaging apparatus according to claim 1, wherein the second recording medium includes a nonvolatile storage element having the first and second data areas, and a controller configured to control an access of data to the nonvolatile storage element.

* * * * *